(No Model.) 3 Sheets—Sheet 1.

M. F. THAYER.
GRAIN WEIGHING APPARATUS.

No. 363,436. Patented May 24, 1887.

Witnesses
M. E. Fowler
H. Bernhof

Inventor
M. F. Thayer
By his Attorneys (No Model.) 3 Sheets—Sheet 2.

M. F. THAYER.
GRAIN WEIGHING APPARATUS.

No. 363,436. Patented May 24, 1887.

Witnesses
Inventor
M. F. Thayer
By his Attorneys (No Model.) 3 Sheets—Sheet 3.

M. F. THAYER.
GRAIN WEIGHING APPARATUS.

No. 363,436. Patented May 24, 1887.

Witnesses　　　　　　　　Inventor
　　　　　　　　　　　　M. F. Thayer
　　　　　　By his Attorneys

UNITED STATES PATENT OFFICE.

MYRON F. THAYER, OF ASHLAND CENTRE, MICHIGAN.

GRAIN-WEIGHING APPARATUS.

SPECIFICATION forming part of Letters Patent No. 363,436, dated May 24, 1887.

Application filed June 19, 1886. Serial No. 205,713. (No model.)

*To all whom it may concern:*

Be it known that I, MYRON F. THAYER, a citizen of the United States, residing at Ashland Centre, in the county of Newaygo and State of Michigan, have invented new and useful Improvements in Grain-Measuring Apparatus, of which the following is a specification.

My invention relates to improvements in grain-measuring apparatus; and it consists of the peculiar combination and novel construction and arrangement of the various parts for service, substantially as hereinafter fully set forth, and specifically pointed out in the claims.

The object of my invention is to provide an improved grain-measuring apparatus which is adapted for use in connection with thrashing-machines, to receive the grain from the latter continuously and automatically discharge the said grain into either one or the other of a number of receptacles on independent measuring devices, which automatically weigh the grain and actuate mechanism to register the number of bushels, &c., that are weighed thereon.

A further object of my invention is to provide an improved apparatus of the class named, which can be compactly folded for the purpose of storage or transportation, to provide an improved registering mechanism which shall be alternately actuated by the measuring devices or scales, so that one mechanism will serve to register the number of bushels weighed by both of the scales, and to provide means whereby ready access to the regulating-weight of the scale-beam can be had to adjust the same for weighing different quantities of grain, all as more fully described.

Figure 1:
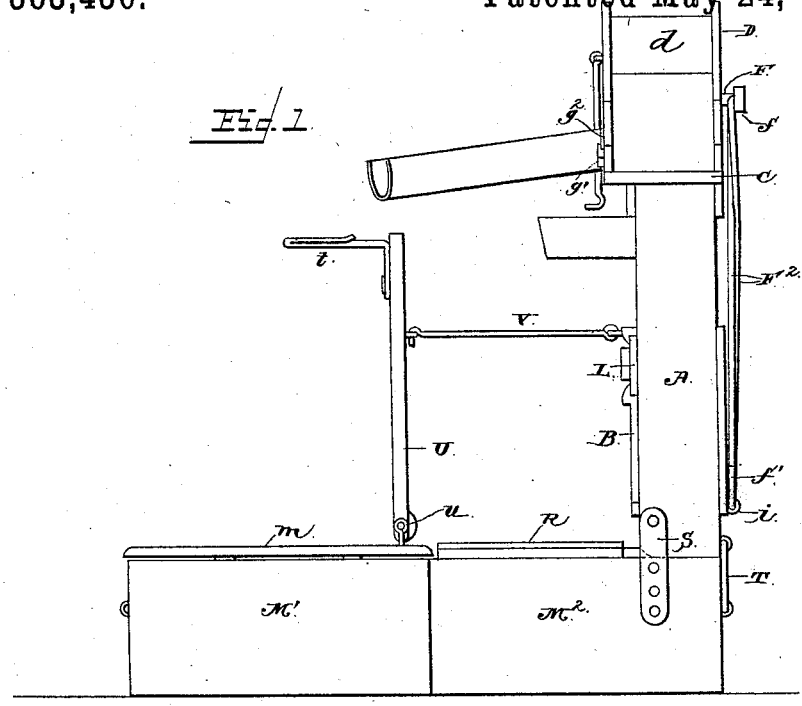
Figure 2:
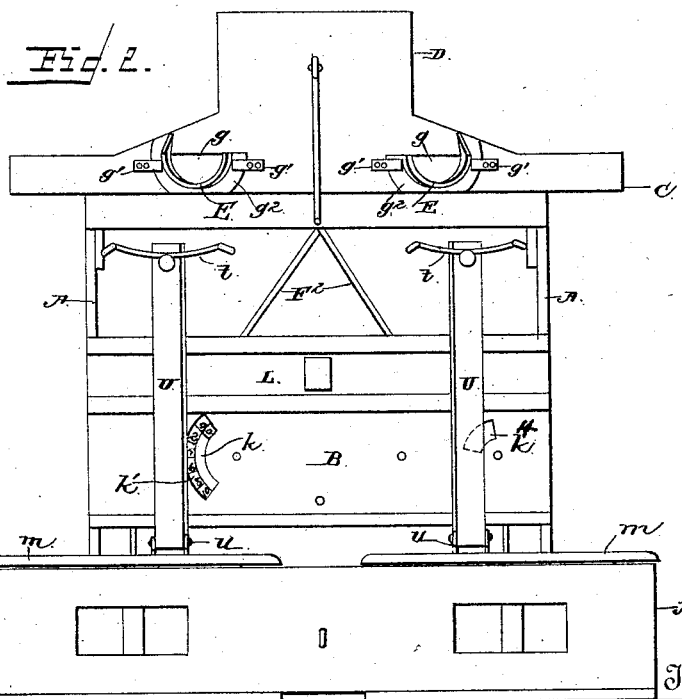
Figure 3:
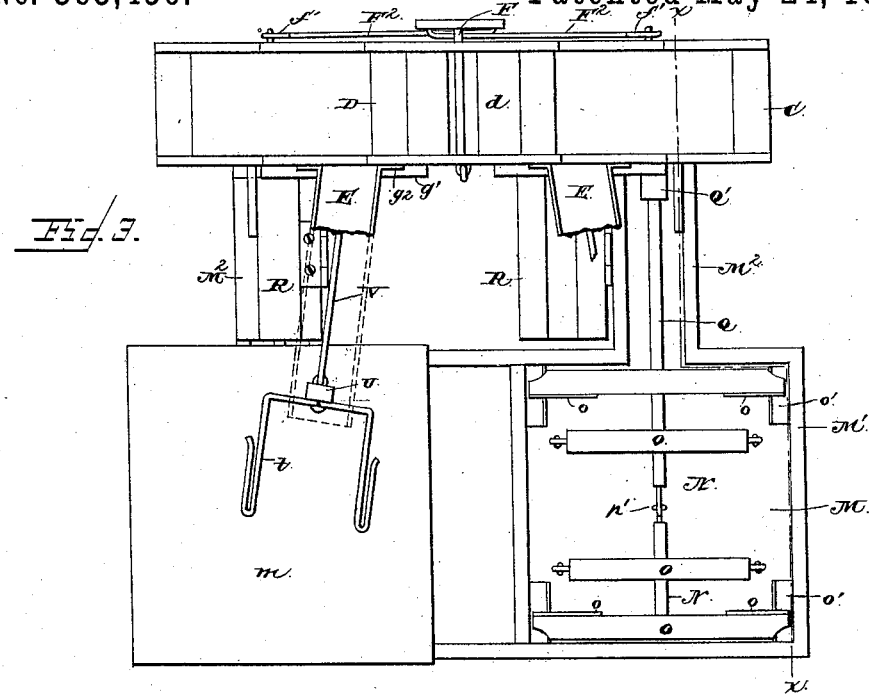
Figure 4:
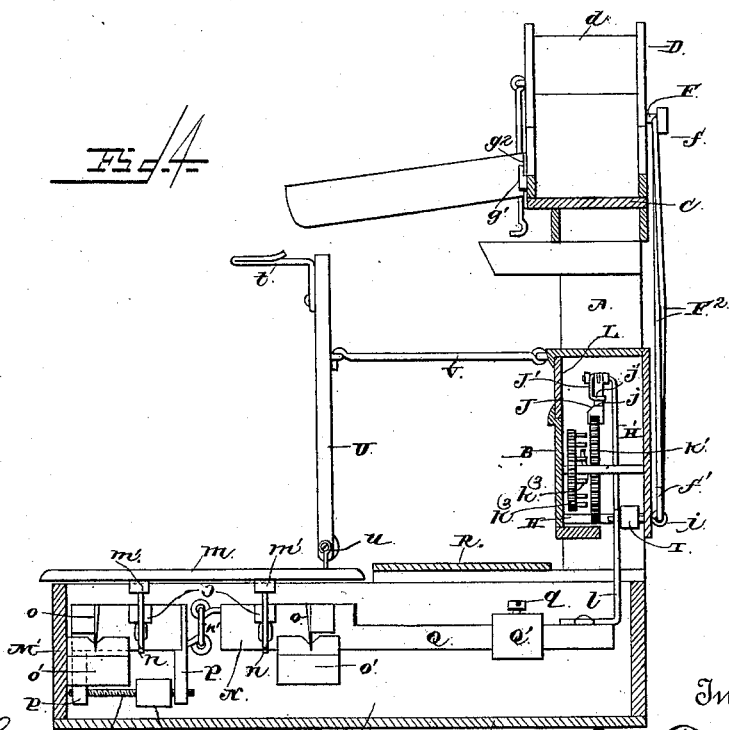
Figure 5:
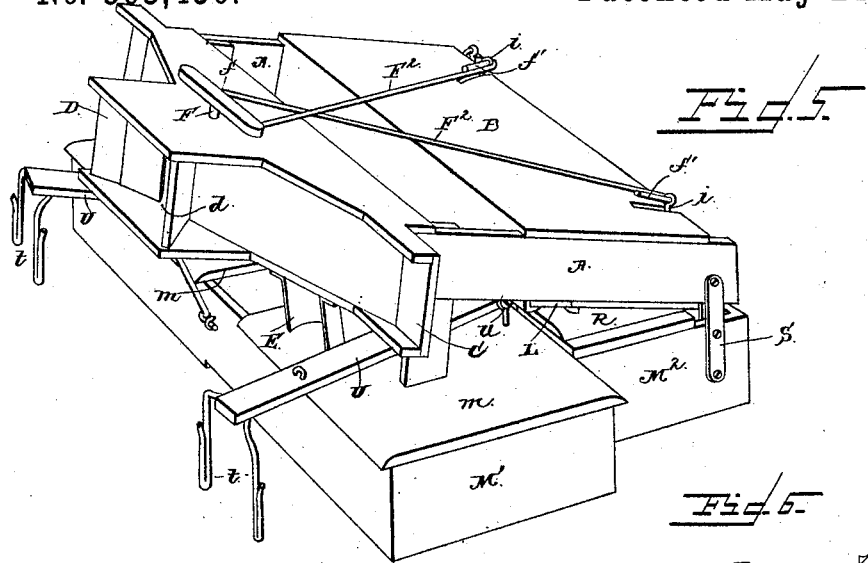
Figure 6:
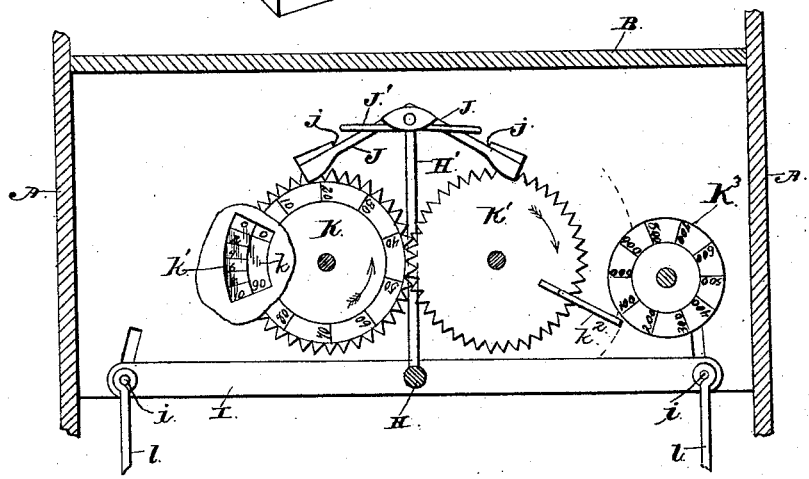
Figure 7:
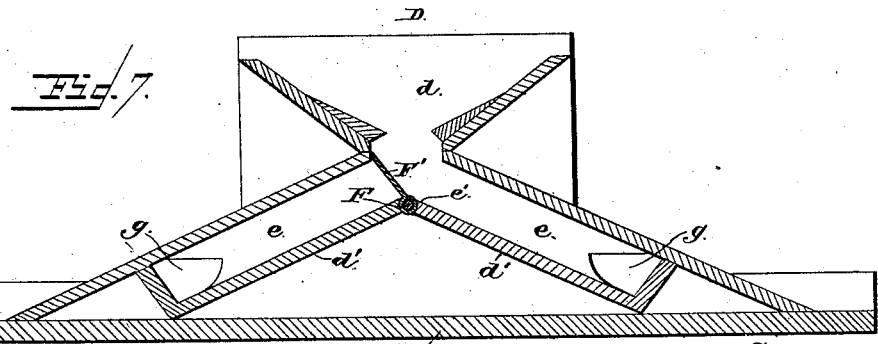

In the accompanying drawings, which illustrate an automatic grain-measuring apparatus embodying my invention, Figure 1 is a side elevation adjusted for use. Fig. 2 is a front elevation. Fig. 3 is a top plan view, and Fig. 4 is a vertical sectional view on the line $x\ x$ of Fig. 3. Fig. 5 is a perspective view of the apparatus folded for transportation or storage. Fig. 6 is a detail view of the registering mechanism. Fig. 7 is a like view of the hopper, with its cut-off and the means for actuating the same.

Referring to the drawings, in which like letters of reference denote corresponding parts in all the figures, A designates the uprights of the frame for the support of the registering mechanism and the hopper, which are set at a suitable interval apart, and connected by the housing B for the registering mechanism, and a platform, C, at the upper extremities of the said uprights, on which the hopper D is located and supported.

The hopper D is provided with a flaring mouth, $d$, and with inclined partitions $d'$, arranged at an angle to each other, and a short distance from the outer walls or shell of the hopper, so as to provide discharge or conducting passages $e$. These passages $e$ diverge in opposite directions, so as to conduct the grain into either one or the other of two discharge-spouts, E, and the partitions that form the said passages $e$ meet together to form an apex, $e'$, that is located immediately beneath the open mouth of the hopper.

A rock-shaft, F, is journaled in the walls of the hopper or in suitable bearings provided therefor and located at or above the apex of the inclined partitions, and this shaft carries a swinging cut-off, F', that is rigidly secured on the same and is adapted to close the space that leads from the hopper to either of the discharge-passages. To one end of this rock-shaft is rigidly affixed a horizontal lever, $f$, that is arranged exteriorly to the hopper in the rear of the apparatus, and to the ends of the said lever are pivotally connected the upper ends of rods $F^2$. These connecting-rods are arranged in inclined positions and cross one another, and the lower ends of the said rods have hooks or eyes $f'$, so that they can be readily connected to and detached from the scale-beams of the weighing devices or scales, presently described.

The grain that passes down the passages $e$ from the hopper D is discharged through transverse openings $g$, which are formed in the side walls of the hopper, so that the grain can be readily passed into the discharge-spouts E, which are suitably secured on the hopper at the lower ends thereof by means of cleats $g'$, that bear on or against a lateral flange, $g^2$, of each of the said spouts, as will be readily seen.

I will now proceed to describe the construction of the registering mechanism for recording the quantity of grain weighed by the scales.

H designates a rock-shaft that is located at or near the lower end of and within the housing B, and this shaft is journaled in the housing, or in suitable bearings provided therefor, and to the shaft is rigidly secured an arm or rod, H', which is arranged in a vertical position and extends upwardly from the shaft. The said rock-shaft also carries an oscillating beam, I, which is secured rigidly thereon, and is arranged longitudinally of the housing or transversely of the apparatus. To the outer free ends of this oscillating beam I are secured transverse pins $i$, which are connected to the lower ends of the connecting-rods F², and to links or pitmen $l$ of the scale-beam of the weighing devices, so that when the scale-beams are alternately depressed the oscillating beam I will be actuated and move the registering devices and the cut-off to direct the grain flowing into the hopper from an elevator into one or the other of the passages $e$.

To the upper end of the arm or rod H' of the rock-shaft H is pivoted the inner ends of pawls J, which are inclined in opposite directions, and have shoulders $j$ on their upper surfaces at their free ends, against which take the lower bent ends, $j'$, of detaining-arms J', also carried by the arm H'. The function of these detaining-arms is to prevent the pawls from becoming displaced, and to keep the arms in their proper relative positions for acting upon the peripheries of the toothed or gear wheels K and K', which are carried by suitable shafts or arbors that are journaled in the housing or in bearings provided therefor.

The front wall of the casing of the apparatus is provided with segmental viewing-openings $k$ $k^4$, which are formed therein near opposite sides of the casing, and to the casing is affixed a segmental dial, $k'$. (Shown in Fig. 2 of the drawings.) This dial is preferably made or formed on a plate or disk separate from the casing and secured within the latter, or the various numerals and indicating-marks can be indelibly stamped or inscribed upon the casing. The dial $k'$ is arranged in such proximity to the viewing-opening $k$ that only the edge thereof having the numerals and indicating-marks can be observed, and so as to leave a space to one side through which one edge of the wheel K can be seen. This wheel K is arranged in rear of the front wall of the casing, to be wholly concealed thereby, except the edge of the same immediately in rear of the viewing-opening $k$. The dial $k'$ has the numerals 0, 2, 4, 6, 8, and 10 inscribed thereon, or it may have the ordinals from 0 to 9, inclusive, as may be preferred, and the wheel K has the ordinals from 0, 10, 20, 30, and so on, to 90, inclusive, and suitable indicating-marks arranged equidistant around its edge or periphery. In practice the indicating-marks and ordinals on the gear-wheel K are separated a distance equal to the terminal marks on the dial, so that as one mark on the wheel disappears from view through the opening $k$ the succeeding marks and its accompanying numeral comes into view. For instance, when the apparatus is started, the gear-wheel K is first adjusted so that the indicating-mark opposite 0 thereon aligns with 0 on the dial $k'$, and as the wheel K is rotated by the action of the pawls and its fellow wheel K' the mark 0 thereon successively passes numerals 2, 4, 6, &c., on the dial to indicate the number of bushels weighed. The continued rotation of the gear-wheel K causes the mark of 0 thereon to successively pass the several numerals on the dial, and as it disappears beyond the lower edge of the viewing-opening $k$ the indicating-mark opposite the numeral 10 on the wheel comes into view from above the upper edge of the viewing-opening. It will thus be seen that the gear-wheel K serves to indicate every ten bushels weighed and measured by the apparatus, the ordinals thereon successively passing the numerals on the dial to indicate up to one hundred bushels, and the gear-wheel K³ is then actuated to record the hundreds of bushels weighed, as will be presently more fully described.

The gear-wheels K K' are of substantially the same diameter, and the teeth on the peripheries thereof mesh or gear together to cause both wheels to revolve simultaneously in opposite directions. The wheels K K' are thus provided with a like number of teeth and make a complete revolution in the same space of time, and the gear-wheel K' lies between the wheels K and K³ to actuate the latter wheel. I will hereinafter term the wheel K the "tens-wheel," the wheel K' the "intermediate wheel," and the wheel K³ the "hundreds-wheel," the latter wheel having the numbers from 100 to 900 suitably inscribed or stamped thereon.

The intermediate wheel, K', of the registering mechanism, which meshes with the tens-wheel K, carries a pin, $k^2$, which projects beyond its periphery, and is adapted to strike or impinge upon one of a series of projecting pins, $k^3$, that are rigidly affixed to the hundreds-wheel K³ of the registering mechanism, said pins being affixed to the rear side of the wheel K³ and projecting into the path of the arm K², so as to be acted upon by the same.

The hundreds-wheel K³ is arranged out of line with the wheels K K', so that the pins thereof project into the path of the arm K², and the figures or numerals on the hundreds-wheel are impressed upon the front face thereof, so that they can be readily seen through the viewing-opening K⁴, hereinbefore referred to, the hundreds-wheel being arranged in rear of the opening K⁴, so that only a portion of the periphery thereof can be observed.

The wheels K and K' are actuated alternately by the gravity-pawls on the vertical arm, and as the wheels are geared together the tens-wheel K is made to change its indication, whether the wheel K or K' is actuated by the said pawls. Both of the wheels are thus rotated continuously, but in opposite directions, although the pawls act thereon alternately, and the hundreds-wheel $K^3$ is made to change its indication at every complete revolution of the intermediate wheel, $K'$, by the arm $k^2$ of the latter wheel acting on the pins $k^3$ of the hundreds-wheel.

Ready access to the gear-wheels of the registering mechanism can be had through an opening that is closed by a removable slide, L, that is retained in place by suitable cleats or ways.

M designates the scales or weighing mechanisms, two of which are provided, and are alternately in use. The said scales have the usual platforms, $m$, which are provided with the battens $m'$ on their lower sides, and to these battens are connected the standards $n$, four of which are provided for each of the platforms to support the same on the knife-edges of the scale-levers, and also elevate the platform out of contact with the casings M' of the scales. These casings are arranged in line with each other and project outwardly from the uprights A, or at right angles thereto, and each casing has a rearward extension, $M^2$, of reduced diameter and size, which extends beneath the housing or case B, so that the scale-beams of the weighing mechanisms are concealed from view and injury.

Each of the weighing mechanisms is provided with two platform-levers, which are arranged within and concealed from view by the casings M', and these levers are provided at their ends with depending plates $o$, having knife-edges which rest or bear on and are supported by blocks $o'$, that are secured in proper position within the casing M'. The platform-levers N are connected by a link, $n'$, and they are further provided with lateral or right-angled arms O, to the outer ends of which are connected the lower ends of the standards $n$ of the platforms, so that when the platform is borne down by the weight thereon the levers are oscillated. One of the levers N is further provided with depending lugs $p$, in which are secured the extremities of a threaded shaft or rod, P, and on this shaft is adjustably fitted a regulating-weight, P', and the other beam of each of the scales is provided with the scale-beam Q, that is rigidly secured to and arranged at right angles to the said oscillating lever, by which it is carried, the scale-beam being arranged in the reduced extension of the casing, so that it is concealed from view thereby. The scale-beam has the link or pitman $l$ connected therewith, and the opposite end of the said link is detachably and pivotally connected to one of the ends of the transverse pin of the oscillating beam I of the registering mechanism.

A regulating-weight, Q', is fitted on the scale-beam of each of the weighing mechanisms, and this weight can be adjusted longitudinally on the beam, and is held in place at any desired adjustment by means of a binding-screw, $q$, that works in a threaded opening in the weight, and ready access to the weight of the scale-beam can be had to adjust the weight through an opening in the reduced extension of the casing, which is closed by a swinging or removable door, R.

For the purpose of readily and conveniently transporting the apparatus from place to place, and for storing it within a small compass when it is not in use, I pivotally connect the uprights A to the extensions of the casings M' of the weighing mechanisms, so that the said uprights, together with the registering mechanism and the hopper carried thereby, can be folded down or over upon the weighing mechanisms. I preferably employ straps S, that are rigidly secured to the casing-extensions by bolts or screws, and are pivotally connected at their opposite or upper ends to the uprights A, as shown, and when the uprights are adjusted to a vertical position to adapt the apparatus for use they are held in such position by catches T, which preferably comprise pivoted hooks, that are adapted to be engaged with eyes or hooks.

The platforms of the weighing mechanisms are each provided with vertically-disposed standards or uprights U, which are arranged near the rear edges of the platforms, and are provided at their upper ends with bag-holders $t$, which support the bag or other like receptacle in proper position to receive the grain from the discharge-spouts E of the hopper. The lower ends of the uprights U are pivoted in suitable bearings, $u$, that are secured on the platform, so that the uprights can be folded down against the platform when the apparatus is folded for transportation or storage, and when the standards are adjusted in their vertical positions for use they are held rigidly in place by means of catches V, which are pivoted on the housing B of the uprights A, and are adapted to be detachably connected with eyes on the uprights U, as shown.

The operation of my invention is obvious. After the apparatus has been properly adjusted for use by unfolding the uprights, together with their hopper and the registering mechanism, and the uprights U with their bag-holders, the grain from an elevator that leads to a thrashing-machine is discharged into the hopper D. The swinging cut-off F' is adjusted to discharge the grain into one of the passages $e$, and prevent the escape of said grain into the other passage, the grain passing through the proper channel and the escape opening into the discharge-spout E, from whence it passes into the receptacle supported on the platform of the weighing mechanism. After the proper quantity of grain has accumulated in the receptacle on one of the platforms of one weighing mechanism, that platform is depressed to actuate the platform-lever, and also the scale-beam, the free end of which scale-beam will be elevated against the action of the regulating-weight thereon, to thus elevate the oscillating beam of the registering mechanism and one of the pawls carried by the arm of the beam, so that one of the gear-wheels, K or K', is moved or rotated a predetermined limited distance. Simultaneously with the oscillation of the beam of the registering mechanism the connecting-rods F² are operated to move or turn the rock-shaft of the swinging cut-off to adjust the latter to close the space between the passage previously used and the hopper, and open the other unused passage, so that the grain from the thrashing-machine elevator will be discharged from the hopper D into the said passage and discharge the grain on the receptacle of one of the weighing mechanisms. This operation of parts is repeated each time a given quantity of grain is measured and discharged, the weighing mechanisms being used alternately to automatically operate the registering devices and adjust the swinging cut-off to discharge the grain alternately into the receptacles on the weighing mechanisms. The scales can be adapted to weigh grain of different heaviness by simply adjusting the regulating-weights in the proper directions.

The apparatus can be compactly folded for storage or transportation, and can be quickly adjusted for use.

Various slight changes in the form and proportion of parts and details of construction can be made without departing from the principle or sacrificing the advantages of my invention.

Having thus fully described my invention, what I claim as new, and desire to secure by Letters Patent, is—

1. In an automatic grain weighing and registering machine, the combination of a hopper having the independent diverging passages or channels, the independent weighing mechanisms, the registering mechanism intermediate of the weighing mechanisms and the hopper, and having an oscillating beam connected with the weighing mechanism to be operated alternately therewith, the dial-wheels, the vertical arm connected with the beam, and the pawls carried by the vertical arm and engaging the dial-wheels to alternately operate the same, and a swinging cut-off located in the hopper at the apex of the diverging channels thereof, and connected with the oscillating beam of the registering mechanism, substantially as described, for the purpose set forth.

2. In an automatic grain weighing and registering machine, the combination of a hopper having the diverging channels, the independent weighing mechanisms having the oscillating scale-beams, the swinging cut-off located at the apex of the diverging channels of the hopper and connected with a lever, $f$, and the registering mechanism arranged between the hopper and the weighing mechanisms, and having an oscillating beam connected at its extremities with the scale-beams of the weighing mechanisms to be alternately actuated thereby, and with the lever $f$ of the cut-off to swing the latter in opposite directions at each movement of the scale-beams, substantially as described, for the purpose set forth.

3. In an automatic grain weighing and registering machine, the combination of a hopper having the diverging channels, the discharge-chutes projecting from the hopper at the extremities of the channels therein, the swinging cut-off located in the hopper at the apex of the channels thereof, the independent scales having the oscillating beams, the registering mechanism located between the hopper and the scales and having the rock-shaft, the beam carried thereby, the vertical arm having the pawls, and the dial-wheels actuated by the pawls, and the rods connecting the oscillating beams of the scales and the cut-off with the ends of the registering mechanism, substantially as described, for the purpose set forth.

4. The combination of a rock-shaft, a horizontal oscillating beam carried thereby, the vertical arm secured at its lower end to the shaft, the oppositely-inclined gravity-pawls pivoted at their inner ends to the vertical arm, the unit and intermediate wheels geared together and having the free ends of the gravity-pawls in engagement with the teeth on their peripheries, and another index-wheel actuated by the intermediate wheel, substantially as described, for the purpose set forth.

5. The combination of the oscillating beam I, having the vertically-disposed arm or rod, the independent gravity-pawls pivoted to and carried by the said arm or rod, the retaining-arms having the bent ends lying over the pawls at or near their free ends, the dial-wheels K and K', having the toothed peripheries with which the free ends of the pawls are engaged, and a wheel, K³, having the pins adapted to be struck by an arm carried by the wheel K' at the end of every complete revolution of the latter, substantially as described, for the purpose set forth.

6. The combination of the hopper having a contracted mouth, and the diverging passages or channels formed by the inclined partitions, having their apexes arranged immediately beneath the center of the mouth of the hopper, a rock-shaft carrying a swinging cut-off to alternately direct the grain from the hopper into the discharge-passages thereof, and provided with a lever arranged exteriorly to the hopper, the independent weighing mechanisms to receive the grain from the diverging discharge-passages alternately, the registering mechanism having the oscillating beam connected with and actuated alternately by the independent weighing mechanisms, and the connecting-rods intermediate the oscillating beam of the registering mechanism and the lever of the rock-shaft, substantially as described, for the purpose set forth.

7. The combination of the scales having the extensions, the uprights pivoted to the extensions and adapted to be folded upon the scales, the hopper carried by the uprights and having the cut-off, the registering mechanism, also carried by the uprights and connected with the scales and the cut-off of the hopper, and the catches for retaining the uprights and the registering mechanism and hopper carried thereby in their proper vertical positions when adjusted for use, substantially as described, for the purpose set forth.

8. The combination of the weighing mechanisms having the foldable uprights carrying the supports for the bags or receptacles, the pivoted uprights supporting the registering mechanism and the receiving-hopper, and catches for maintaining the uprights in their vertical positions, substantially as described.

9. The combination of the vertically-movable platform, the platform-levers having the knife-edges and the lateral arms, the standards intermediate of the arms of the levers and the platform, the weighted scale-beam carried by one of the platform-levers, a threaded rod having an adjustable weight carried by the other beam, the registering mechanism connected with and actuated by the scale-beam, and the hopper, substantially as described.

In testimony that I claim the foregoing as my own I have hereto affixed my signature in presence of two witnesses.

MYRON F. THAYER.

Witnesses:
D. J. PEACOCK,
W. H. DAVIS.